Patented Dec. 22, 1953

2,663,731

UNITED STATES PATENT OFFICE 2,663,731

PURIFICATION OF UREA

Walter Michelitsch, Ludwigshafen (Rhine-Oppau), Germany, assignor to Badische Anilin- & Soda-Fabrik Aktiengesellschaft, Ludwigshafen (Rhine), Rheinland-Pfalz, Bundesrepublik, Germany No Drawing. Application March 26, 1951, Serial No. 217,687

Claims priority, application Germany April 6, 1950

5 Claims. (Cl. 260—555)

This invention relates to a process for the recovery of urea having an at the most slight content of biuret from biuret-containing urea.

Urea obtained synthetically by the reaction of ammonia with carbon dioxide under increased pressure and at elevated temperature always contains small amounts of biuret. While the biuret content of the concentrated urea solution withdrawn from the high pressure reaction vessel is comparatively small, it increases appreciably when removing the unreacted initial materials ammonia and carbon dioxide, and the major part of the biuret content, which may amount to several per cent, is formed during the subsequent recovery of the solid urea from the solution. This recovery is effected by converting the solution, by evaporation of water, into a melt poor in water and solidifying the latter to granular urea by spraying by means of an air current or a centrifuge. Another possible method of recovering solid urea, and indeed in the form of individual crystals, consists in causing the urea solution to crystallise by cooling and separating the deposited crystals from the mother liquor. Such urea also often contains biuret.

I have now found that urea with improved properties, in particular with a substantially reduced biuret content, is obtained by treating the urea, whether it be the product obtained by allowing the urea melt to solidify or the product obtained by crystallisation from the solution, with an aqueous urea solution, preferably with a saturated solution. By this treatment, it is practically only the biuret which is dissolved out from the urea, the purified urea remaining substantially undissolved. The treatment may be carried out at room temperature in a conventional stirring vessel. Since the dissolving out of the biuret takes place very rapidly, relatively small apparatus is sufficient and the process may readily be carried out continuously. Instead of stirring the urea with the solution, it may be arranged in a layer and sprayed with the solution or it may be led through a mixing spiral together with the solution.

The urea granules obtained by solidifying urea melts partly break down during the treatment into small individual crystals which, compared with the crystal needles obtained by crystallisation from solutions, have a short and more compact shape and are distinguished by a good capacity for being stored.

For carrying out the process industrially, it is preferable to use the urea solution containing a comparatively small amount of biuret, for example less than 1%, withdrawn from the high pressure reaction vessel in the urea synthesis. If the treatment of the urea is to be carried out at room temperature, the said concentrated solution is preferably first diluted with water to give saturation at room temperature, so that a litre of solution contains about 600 grams of urea. Removal of unreacted ammonia and carbon dioxide from the solution before its employment for the treatment of the solid urea is not essential because ammonia and carbon dioxide do not influence the solubility of biuret in the urea solution.

If the solid urea to be treated still contains considerable amounts of water, it is advantageous to employ a urea solution which is saturated at slightly elevated temperature so that by absorption of water from the solid urea during the treatment it is converted into the concentration corresponding to saturation at room temperature.

In this way it is easy to reduce the biuret content in urea to about 0.1 to 0.2%. In order to recover urea with a yet lower biuret content, for example with less than 0.01% of biuret, it is preferable to subject the urea to a further washing with a urea solution free from biuret.

The following examples will further illustrate this invention but the invention is not restricted to these examples. The parts are by weight.

Example 1

100 parts of granular urea which has been obtained by spraying a urea melt containing about 6% of water by means of a current of air and which contains 3% of biuret, is stirred for 20 minutes with 100 parts of an aqueous urea solution which is saturated at room temperature. The urea is then separated from the liquid by centrifuging and dried. 92 parts of crystalline urea having a biuret content of only 0.1% are obtained.

Example 2

A hot urea solution which has been obtained by the reaction of ammonia and carbon dioxide under pressure and elevated temperature and which, after removal of the major portion of the unreacted initial materials, consists of 83% of urea, 1% of biuret, 0.1% of ammonia, 0.1% of carbon dioxide and 15.8% of water, is solidified by rapid cooling on a cooling roller. 100 parts of the resulting comminuted crystal mass are stirred for 25 minutes with 80 parts of a solution of urea which is saturated at room temperature and which contains 0.7% of biuret. The urea is then separated from the liquid and dried. 92 parts of urea having a biuret content of less than 0.04% are obtained.

Example 3

100 parts of urea which has been obtained by crystallisation from a hot concentrated urea solution and which contains 0.4% of biuret, are stirred for 10 minutes with 80 parts of an aqueous urea solution which is saturated at room temperature. By separating from the liquid and drying, 98 parts of urea having a biuret content of only 0.02% are obtained.

What I claim is:

1. A process for purifying solid urea containing biuret as an impurity which comprises treating a solid biuret-containing urea with an aqueous solution of urea, thereby to dissolve out the biuret while leaving the urea substantially undissolved, and separating the purified solid urea from the solution.

2. A process for purifying solid urea containing biuret as an impurity which comprises treating a solid biuret-containing urea with an aqueous solution of urea saturated with urea at the treating temperature, thereby to dissolve out the biuret while leaving the urea substantially undissolved, and separating the purified solid urea from the solution.

3. A process for purifying solid urea containing biuret as an impurity which comprises treating a solid biuret-containing urea with a concentrated aqueous urea solution containing ammonia and carbon dioxide thereby to dissolve out the biuret while leaving the solid urea substantially undissolved, and separating the purified solid urea from the solution.

4. A process for purifying solid urea containing biuret as an impurity which comprises treating a solid biuret-containing urea at room temperature with an aqueous solution of urea containing ammonia, carbon dioxide and biuret and diluted with water to a concentration of about 600 grams urea per liter of solution at room temperature, thereby to dissolve out the biuret while leaving the purified solid urea substantially undissolved and separating the purified solid urea from the solution.

5. A process for purifying solid urea containing biuret as an impurity which comprises treating a solid biuret-containing urea having an appreciable content of water with an aqueous solution of urea saturated with respect to urea at a temperature above the treating temperature, absorbing the water from the biuret-containing solid urea whereby a solution is formed which is saturated with respect to urea at the treating temperature, and separating the treated undissolved urea from the solution.

WALTER MICHELITSCH.

References Cited in the file of this patent

UNITED STATES PATENTS

| Number | Name | Date |
|---|---|---|
| 1,908,995 | Miller | May 16, 1933 |
| 2,017,588 | De Ropp et al. | Oct. 15, 1935 |
| 2,116,881 | De Ropp | May 10, 1938 |
| 2,297,034 | Strzyzewski et al. | Sept. 29, 1942 |
| 2,498,539 | Frejacques | Feb. 21, 1950 |